No. 608,970. Patented Aug. 9, 1898.
A. WOOD.
LINK FOR POLES, TRACES, &c.
(Application filed July 20, 1895.)
(No Model.)
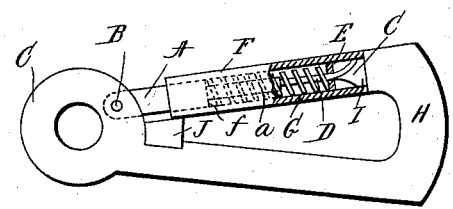
Witnesses
John Buckler
S. L. Hawkshurst
Alfred Wood
Edgar Tate, Inventor
By Attorneys

UNITED STATES PATENT OFFICE.

ALFRED WOOD, OF FOLKESTONE, ENGLAND.

LINK FOR POLES, TRACES, &c.

SPECIFICATION forming part of Letters Patent No. 608,970, dated August 9, 1898.

Application filed July 20, 1895. Serial No. 556,642. (No model.)

*To all whom it may concern:*

Be it known that I, ALFRED WOOD, a subject of the Queen of Great Britain, and a resident of Folkestone, in the county of Kent, England, have invented new and useful Improvements in Links or Couplings for Poles and Chains, also Pole-Pieces and Traces, of which the following is a specification.

My invention relates to improvements in links, loops, or fastenings for pole-straps or chains, traces, and for other purposes, and has for its object to provide a simple device or devices which will allow of the traces, chains, or the like being more readily attached to and detached from said links, loops, or fastenings than heretofore, the latter being easier to manipulate, less liable to get out of order, and more effective and safer than the old form.

My improvements when applied to the purpose of yoking or releasing animals can be attached either to the carriage pole or harness, the slip-links hereinafter described being particularly adapted for the purpose of quickly releasing fallen horses or other animals.

In order to fully explain the invention, I have attached to this specification a sheet of drawing, in which A is the arm, hinged at B to the ring, boss, or eye C, and the thickness of the arm A is reduced a short distance from its pivot end, as at *a*, to admit of the spring G passing over or around the same and bearing against shoulder *b* at one end and against perforated partition E at its other end. The arm A is still further reduced in thickness at the end farthest from its pivot, as at D, and passes through the perforated partition E in the sliding tube F, and has its end "burred" over, as shown by *c*, to prevent the spring G forcing off the sliding tube or barrel when the arm is disengaged from the hooked or curved end H of the link.

The top of the sliding tube F is held firmly up against and temporarily secured to the hook of the link by means of a rounded or beveled projection I formed upon the same or in other suitable manner. A stop J prevents arm A from being pressed inward beyond the projection I when closing the link and may be made solid with the rigid arm of the link or attached in any other suitable manner.

What I do claim as my invention, and desire to secure by Letters Patent, is—

A spring-hook, substantially as herein shown and described, consisting of the eye C, the arm A hinged thereto, the sliding tube F mounted on said arm said arm being reduced adjacent to the pivot end, and provided with a shoulder at one end thereof, and with a perforated partition at its outer end, which is fixed in the tube, a spring G mounted on said arm and adapted to bear against said shoulder and partition, the hook being provided with a round or beveled projection I, against which the tube F is firmly held and a stop J formed on said hook on the arm A, which is adapted to limit the inward movement thereof, all constructed and adapted to operate as herein set forth and described.

ALFRED WOOD.

Witnesses:
VINCENT HUGHES,
ALF. A. THORNTON.